US012792614B2

(12) United States Patent
Motte et al.

(10) Patent No.: US 12,792,614 B2
(45) Date of Patent: Nov. 10, 2026

(54) APPARATUS, SYSTEMS AND METHODS FOR SCORING AND DISTRIBUTING THE RELIABLITY OF ONLINE INFORMATION

(71) Applicant: Lucas J. Myslinski, Sunnyvale, CA (US)

(72) Inventors: Stanislas Motte, Paris (FR); Ramon Ruti, Montpellier (FR); Arnaud Jacolin, Lyons (FR); Pierre-Albert Ruquier, Ruelle sur Touvre (FR)

(73) Assignee: Lucas J. Myslinski, Sunnyvale, CA (US)

( * ) Notice: Subject to any disclaimer, the term of this patent is extended or adjusted under 35 U.S.C. 154(b) by 8 days.

(21) Appl. No.: 18/950,835

(22) Filed: Nov. 18, 2024

(65) Prior Publication Data

US 2025/0077532 A1 Mar. 6, 2025

Related U.S. Application Data

(60) Division of application No. 18/123,584, filed on Mar. 20, 2023, now Pat. No. 12,174,843, which is a (Continued)

(51) Int. Cl.
*G06F 17/30* (2006.01)
*G06F 16/2457* (2019.01)
(Continued)

(52) U.S. Cl.
CPC ...... *G06F 16/24578* (2019.01); *G06F 16/285* (2019.01); *G06F 16/40* (2019.01);
(Continued)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 5,960,411 A 9/1999 Hartman et al.
6,067,303 A * 5/2000 Aaker ................ H04L 12/5601 370/522
(Continued)

FOREIGN PATENT DOCUMENTS

GB 2428529 A 1/2007
WO 2001077906 A2 10/2001
(Continued)

OTHER PUBLICATIONS

Office Action from U.S. Appl. No. 15/024,574.
(Continued)

*Primary Examiner* — Hung D Le
(74) *Attorney, Agent, or Firm* — Haverstock & Owens

(57) ABSTRACT

The apparatus, systems and methods dynamically provide the reliability of multimedia documents by applying a series of intrinsic criteria and extrinsic criteria by pre-calculating a reliability score for at least a set of multimedia documents of at least one pre-selected source of multimedia documents, and by providing, in response to a request, the multimedia documents from the pre-selected sources associated with the score and the multimedia documents from the other sources associated with a score conditionally calculated.

20 Claims, 9 Drawing Sheets

Related U.S. Application Data continuation of application No. 17/141,720, filed on Jan. 5, 2021, now Pat. No. 11,755,595, which is a continuation of application No. 16/190,824, filed on Nov. 14, 2018, now Pat. No. 10,915,539, which is a division of application No. 15/024,574, filed as application No. PCT/EP2014/070331 on Sep. 24, 2014, now Pat. No. 10,169,424, which is a continuation-in-part of application No. 14/039,333, filed on Sep. 27, 2013, now abandoned.

(51) Int. Cl.

| | |
|---|---|
| ***G06F 16/28*** | (2019.01) |
| ***G06F 16/40*** | (2019.01) |
| ***G06F 16/483*** | (2019.01) |
| ***G06F 16/93*** | (2019.01) |
| ***G06F 16/951*** | (2019.01) |
| ***G06F 16/958*** | (2019.01) |
| ***G06F 40/253*** | (2020.01) |
| ***G06F 40/295*** | (2020.01) |

(52) U.S. Cl.
CPC ............ *G06F 16/483* (2019.01); *G06F 16/93* (2019.01); *G06F 16/951* (2019.01); *G06F 16/986* (2019.01); *G06F 40/253* (2020.01); *G06F 40/295* (2020.01)

(58) Field of Classification Search
CPC ....... G05B 13/00; H03M 7/30; H04N 9/8042; G06T 9/00
See application file for complete search history.

(56) References Cited

U.S. PATENT DOCUMENTS 6,161,090 A 12/2000 Kanevsky et al.
6,188,771 B1 * 2/2001 Horrall .................. H04K 3/825 381/94.3
6,256,734 B1 7/2001 Blaze et al.
6,266,664 B1 7/2001 Russell-Falla et al.
6,317,795 B1 * 11/2001 Malkin .............. H04N 21/4532 348/E7.071
6,507,838 B1 * 1/2003 Syeda-Mahmood ........................ G06F 16/7844
6,782,510 B1 8/2004 Gross et al.
7,249,058 B2 7/2007 Kim et al.
7,249,380 B2 7/2007 Yang
7,266,116 B2 9/2007 Halpern
7,337,462 B2 2/2008 Dudkiewicz et al.
7,478,078 B2 1/2009 Lunt et al.
7,487,334 B2 2/2009 Konigsburg et al.
7,644,088 B2 1/2010 Fawcett et al.
7,657,424 B2 2/2010 Bennett
7,765,574 B1 7/2010 Maybury et al.
7,809,721 B2 10/2010 Putivsky et al.
8,185,448 B1 5/2012 Myslinski
8,225,164 B2 7/2012 Westerlund et al.
8,229,795 B1 7/2012 Myslinski
8,290,924 B2 10/2012 Rajaram
8,290,960 B2 10/2012 Li et al.
8,321,295 B1 11/2012 Myslinski
8,401,919 B2 3/2013 Myslinski
8,423,424 B2 4/2013 Myslinski
8,458,046 B2 6/2013 Myslinski
8,510,173 B2 8/2013 Myslinski
8,583,509 B1 11/2013 Myslinski
8,775,354 B2 7/2014 Kast
9,118,823 B2 8/2015 Ito
9,143,534 B1 * 9/2015 Kelliher .............. H04L 65/1069
9,253,137 B1 * 2/2016 Jackson .................. H04L 51/52
9,300,755 B2 3/2016 Gerke
9,495,416 B2 11/2016 Kwon
2002/0049738 A1 4/2002 Epstein
2002/0083468 A1 6/2002 Dudkiewicz
2002/0099730 A1 7/2002 Brown et al.
2002/0099731 A1 * 7/2002 Abajian .................. G06F 16/48 715/204
2003/0088689 A1 5/2003 Alexander, Jr. et al.
2003/0158872 A1 8/2003 Adams
2003/0210249 A1 11/2003 Simske
2004/0103032 A1 5/2004 Maggio
2004/0122846 A1 6/2004 Chess et al.
2004/0139077 A1 7/2004 Banker
2004/0210824 A1 10/2004 Shoff et al.
2005/0022252 A1 1/2005 Shen
2005/0060312 A1 3/2005 Curtiss et al.
2005/0120391 A1 6/2005 Haynie et al.
2005/0132420 A1 6/2005 Howard et al.
2005/0235199 A1 10/2005 Adams
2006/0015904 A1 1/2006 Marcus
2006/0064633 A1 3/2006 Adams
2006/0148446 A1 7/2006 Karlsson
2006/0206912 A1 9/2006 Klarfeld et al.
2006/0212904 A1 9/2006 Klarfeld et al.
2006/0248076 A1 11/2006 Troy et al.
2006/0253580 A1 11/2006 Dixon et al.
2006/0293879 A1 12/2006 Zhao et al.
2007/0011710 A1 1/2007 Chiu
2007/0043766 A1 2/2007 Nicholas et al.
2007/0100730 A1 5/2007 Batashvili et al.
2007/0110089 A1 5/2007 Essafi
2007/0136781 A1 6/2007 Kawai
2007/0136782 A1 6/2007 Ramaswamy et al.
2007/0288978 A1 12/2007 Pizzurro et al.
2008/0010126 A1 * 1/2008 Gunshor ............. G06F 16/2457 705/14.54
2008/0073432 A1 * 3/2008 Barenburg ............. G06Q 10/08 235/385
2008/0077570 A1 3/2008 Tang et al.
2008/0082662 A1 4/2008 Dandliker
2008/0109285 A1 5/2008 Reuther et al.
2008/0109780 A1 5/2008 Stern et al.
2008/0177793 A1 7/2008 Epstein
2008/0183726 A1 7/2008 Bruckner et al.
2008/0205773 A1 * 8/2008 Ma ......................... G06V 20/52 382/225
2008/0319744 A1 12/2008 Goldberg
2009/0063294 A1 3/2009 Hoekstra et al.
2009/0125382 A1 5/2009 Delepet
2009/0187951 A1 7/2009 McCarthy
2009/0210395 A1 8/2009 Sedam
2009/0265304 A1 10/2009 Ait-Mokhtar et al.
2009/0310863 A1 * 12/2009 Gallagher .............. G06V 40/16 382/182
2009/0311659 A1 12/2009 Lottridge et al.
2010/0008241 A1 * 1/2010 Gustafsson ...... H04N 21/44004 370/252
2010/0023525 A1 1/2010 Westerlund et al.
2010/0049590 A1 2/2010 Anshul
2010/0070448 A1 3/2010 Omoigui
2010/0121638 A1 5/2010 Pinson et al.
2010/0121973 A1 5/2010 Lobacheva et al.
2010/0125581 A1 * 5/2010 Peleg .................... G06F 16/739 707/E17.046
2010/0215279 A1 8/2010 Gao
2010/0235313 A1 9/2010 Rea et al.
2010/0306166 A1 12/2010 Pantel et al.
2010/0332583 A1 12/2010 Szabo
2011/0043652 A1 2/2011 King et al.
2011/0064268 A1 * 3/2011 Cobb ..................... G06V 20/52 382/160
2011/0066587 A1 3/2011 Ferrucci et al.
2011/0067065 A1 3/2011 Karaoguz et al.
2011/0087639 A1 4/2011 Gurney
2011/0093258 A1 4/2011 Xu et al.
2011/0106615 A1 5/2011 Churchill et al.
2011/0136542 A1 6/2011 Sathish
2011/0137918 A1 * 6/2011 Yasrebi ................... G06F 16/51 704/235
2011/0153602 A1 6/2011 Kiddle
2011/0166860 A1 7/2011 Tran

(56) References Cited

U.S. PATENT DOCUMENTS

2011/0208723 A1* 8/2011 Nicks ................. G06Q 30/0283 707/723
2011/0222787 A1* 9/2011 Thiemert ............ G06F 16/7864 382/224
2011/0305399 A1 12/2011 Zitnick
2011/0313757 A1 12/2011 Hoover et al.
2012/0005221 A1 1/2012 Ickman et al.
2012/0030711 A1 2/2012 Rae
2012/0059656 A1* 3/2012 Garland .................. G10L 25/00 704/254
2012/0078626 A1 3/2012 Tsai
2012/0078691 A1 3/2012 Tsai
2012/0078712 A1 3/2012 Fontana
2012/0078899 A1 3/2012 Fontana
2012/0079380 A1 3/2012 Tsai
2012/0102405 A1 4/2012 Zuckerman et al.
2012/0131005 A1 5/2012 Shen
2012/0131015 A1 5/2012 Al Badrashiny et al.
2012/0136853 A1 5/2012 Kennedy
2012/0158711 A1 6/2012 Curtiss et al.
2012/0191757 A1 7/2012 Gross et al.
2012/0198319 A1 8/2012 Agnoli et al.
2012/0272143 A1 10/2012 Gillick
2012/0317046 A1 12/2012 Myslinski
2013/0007403 A1* 1/2013 Malcolm ............... G06F 11/008 711/171
2013/0036353 A1 2/2013 Zavesky
2013/0038705 A1 2/2013 Morita
2013/0044620 A1* 2/2013 Sul .......................... H04L 65/80 370/252
2013/0060757 A1 3/2013 Myslinski
2013/0074110 A1 3/2013 Myslinski
2013/0091436 A1 4/2013 Rose et al.
2013/0099925 A1 4/2013 Pederson
2013/0110748 A1 5/2013 Talati et al.
2013/0129258 A1 5/2013 Conrad
2013/0151240 A1 6/2013 Myslinski
2013/0158984 A1 6/2013 Myslinski
2013/0159127 A1 6/2013 Myslinski
2013/0188809 A1 7/2013 Jones
2013/0191298 A1 7/2013 Myslinski
2013/0198196 A1 8/2013 Myslinski
2013/0235928 A1* 9/2013 Chung ................. H04N 19/139 375/240.03
2013/0297942 A1* 11/2013 Conwell ............... G06F 16/489 713/176
2013/0308920 A1 11/2013 Myslinski
2013/0311388 A1 11/2013 Myslinski
2013/0318253 A1* 11/2013 Kordasiewicz ....... H04L 65/765 709/231
2013/0346160 A1 12/2013 Dunst
2014/0029804 A1 1/2014 Kawaguchi
2014/0032538 A1 1/2014 Arngren
2014/0045468 A1* 2/2014 Mikkelsen ............ G06F 16/182 455/414.1
2014/0074751 A1 3/2014 Rocklitz
2014/0098899 A1 4/2014 Mohandas
2014/0147057 A1 5/2014 Zhai
2014/0267917 A1 9/2014 Backer
2014/0280206 A1 9/2014 Krishnamurthy
2014/0281012 A1 9/2014 Troxler
2014/0363143 A1 12/2014 Dharssi
2015/0020106 A1 1/2015 Belyaev
2015/0058278 A1* 2/2015 Fankhauser ......... G06F 16/2365 707/602
2015/0082349 A1* 3/2015 Ishtiaq ............... H04N 21/4316 725/40
2015/0095320 A1* 4/2015 Motte ................... G06F 40/295 707/723
2015/0106390 A1* 4/2015 Fuchs ............... G06F 16/24578 707/749
2015/0154879 A1* 6/2015 Poor .................... G06V 30/224 434/354
2015/0261594 A1 9/2015 Robichaud
2015/0271096 A1* 9/2015 Das ....................... G06F 9/5016 709/213
2015/0350730 A1* 12/2015 el Kaliouby ....... H04N 21/4667 725/12
2016/0021139 A1 1/2016 Stephan
2017/0060860 A1 3/2017 Imbruce
2018/0032997 A1* 2/2018 Gordon .............. G06Q 30/0269
2018/0309747 A1 10/2018 Sweet

FOREIGN PATENT DOCUMENTS

WO 2001077907 A2 10/2001
WO 2003014949 A1 2/2003
WO 2004034755 A2 4/2004
WO 2006036853 A2 6/2006
WO 2007115224 A2 10/2007
WO 2009006542 A2 1/2009
WO 2009089116 7/2009
WO 2010093510 A1 8/2010
WO 2010105245 A2 9/2010
WO 2011088264 A1 7/2011

OTHER PUBLICATIONS

Notice of Allowance from U.S. Appl. No. 15/024,574.
Notice of Allowance from U.S. Appl. No. 16/190,824.
First Office Action from U.S. Appl. No. 17/141,720.
Second Office Action from U.S. Appl. No. 17/141,720.
Ulken, A Question of Balance: Are Google News search results politically biased? May 5, 2005, <http://ulken.com/thesis/googlenews-bias-study.pdf>.
<http://jayrosen.posterous.com/my-simple-fix-for-the-messed-up-sunday-shows> (Dec. 27, 2009).
<http://en.wikipedia.org/wiki/SpinSpotter> (Jul. 1, 2010).
Wendell Cochran; Journalists aren't frauds; the business has fine lines; Ethics classes would help them stay on right side; The Sun. Baltimore, Md.: Jul. 19, 1998. p. 6.C; http://proquest.umi.com/pqdweb?did=32341381&SID=3&Fmt=3&clientId=19649&RQT=309&VName=PQD.
Sorry for the Spam, Truth Goggles, <http://slifty.com/projects/truth-goggles/>, Oct. 29, 2012.
LazyTruth Chrome extension fact checks chain emails, <http://www.theverge.com/2012/11/14/3646294/lazytruth-fact- check-chain-email>, Nov. 14, 2012.
Announcing Truth Teller beta, a better way to watch political speech, <http://www.washingtonpost.com/blogs/ask-the-post/wp/2013/09/25/announcing-truth-teller-beta-a-better-way-to-watch-political-speech/>, Sep. 25, 2013.
Ryosuke Nagura et al.: "A method of rating the credibility of news documents on the web, "Proceedings of the 29th Annual International ACM SIGIR Conference on Research and Development in Information Retrieval, SIGIR '06, Aug. 6, 2006, p. 683.
Andreas Juffinger et al.: "Blog credibility ranking by exploiting verified content," Proceedings of the 3rd Workshop on Information Credibility on the Web, WICOW '09, Apr. 20, 2009 (Apr. 20, 2009), p. 51.
Written Opinion of the International Searching Authority for PCT/EP2014/070331.
International Search Report for PCT/EP2014/070331.
Notice of Allowance from U.S. Appl. No. 17/141,720.
Restriction Requirement from U.S. Appl. No. 18/123,584.
Office Action from U.S. Appl. No. 18/123,584.
Final Office Action from U.S. Appl. No. 18/123,584.
Notice of Allowance from U.S. Appl. No. 18/123,584.
Final Office Action from U.S. Appl. No. 17/141,720.

* cited by examiner

APPARATUS, SYSTEMS AND METHODS FOR SCORING AND DISTRIBUTING THE RELIABLITY OF ONLINE INFORMATION

FIELD

The present invention relates to the field of apparatus, systems and methods for big data analysis, in order to score and distribute the reliability of online information with a high efficiency and a real-time availability of the processed information.

BACKGROUND

Consumers regularly consult information relating to almost any topic on the World Wide Web. However, a large volume of information is returned to the consumer with an unpredictable quality. In order to qualify the information, different technologies have been developed.

For example, U.S. Pat. No. 2009/0125382 provides an indication of a data source's accuracy with respect to past expressed opinions. The data source is assigned with predication scores based on the verified credibility of historical documents. A reputation score is assigned for a new document as a function of the predication scores from the historical documents, data source affiliations, document topics and other parameters.

Another example is U.S. Pat. No. 7,249,380 providing a model to evaluate trust and transitivity of trust of online services. The trust attributes are categorized in three categories, which relate to contents, owner of the web document and the relationships between the web document and certificate authorities.

U.S. Pat. No. 8,423,424 describes a web page fact-checking system of information and/or characterizes the information by comparing the information with one or more sources.

U.S. Pat. No. 7,809,721 describes a system for ranking data including three calculations: firstly, the quantitative semantic similarity score calculation which shows the qualitative relevancy of the particular location to the query; secondly, the general quantitative score calculation which comprises a semantic similarity score, a distance score and a rating score; thirdly, the addition of the quantitative semantic similarity score and the general quantitative score to obtain a vector score.

However, all the existing methods work in a passive mode: the calculation is carried out only when a query is launched. These technologies take a long time for the calculation and are not optimized for the dynamic update of the information on the World Wide Web. In the context of the fast development of social networks in particular, all users can constantly update information by broadcasting comments through all types of media.

Technical difficulties result in a huge number of data and information sources that have to be taken into account in order to calculate a relevant score, with the additional difficulty of the continuously changing scope of information. Calculating the score on the fly for a document requested by a user would require too many resources and time. Furthermore, attributing a score to each document that may be requested by a user and refreshing all these scores every time a new document or information becomes available is also too complicated.

SUMMARY

The present invention dynamically provides the reliability of multimedia documents by applying a series of intrinsic criteria and extrinsic criteria. All the pre-calculated reliability scores of a subset of the existing multimedia documents are stored in a database so customers just need to retrieve the scores already pre-calculated, thus it is less time-consuming than triggering the calculation process of the full set of existing documents. These scores can be updated according to the publishing of various sources including the comments of social networks and communities. Additionally, all the subsets of multimedia documents are cross-checked amongst different sources.

The inventive subject matter provides apparatus, systems and methods in which multimedia documents are attributed a reliability score that is distributed to customers via various modes and different tools. One aspect of the inventive subject matter includes a method to provide a customer with at least one multimedia document associated to a reliability score that is calculated by applying a first category of intrinsic criteria and a second category of extrinsic criteria. It comprises first steps of pre-calculating the reliability score for at least a set of multimedia documents of at least one pre-selected source of documents, second steps of updating this reliability score by applying the extrinsic criteria, and a last step for providing, in response to a customer's request, the multimedia documents from the pre-selected sources associated with the updated score and the multimedia documents from the other sources associated with a score conditionally calculated.

A calculation of the score for the multimedia documents from the other sources is activated by an action from the customer. Besides, it is also activated by the detection of at least one request coming from the customer device in the case of getting multimedia documents that do not have a precalculated score. In addition, the score of multimedia documents coming from the other sources are pre-calculated when a threshold of interest is reached. The processing of pre-calculation of the score of the multimedia documents within a pre-selected source is prioritized according to an interest indicator, where the interest indicator is weighted by the number of requests and the measure of engagements.

The reliability scores are time-stamped and associated to the related time-stamped version of the documents. So when a discrepancy is detected between the time-stamp of the reliability score and the time-stamp of the related document, the pre-processing of the document is updated. This detection of the discrepancies could be performed by the customer's device.

The representation of the pre-calculated scored documents is computed by the customer device through an aggregation of the multimedia documents coming from the source's servers and the related scores coming from the score processing server. The document acquisition can be performed by both the score processing server and the customer device.

The method of scoring the reliability of online information comprises additional steps of computing, for at least one source, a global reliability score of the source, based on the reliability score of its multimedia documents and the number of its visionary documents. The method for scoring the reliability of online information comprises a step of filtering according to a white list, so as to exclude the checking of an existing reliability score for multimedia documents coming from sources not belonging to the white list; or according to a black list, so as to exclude the checking of an existing reliability score for multimedia documents coming from sources belonging to the black list.

DETAILED DESCRIPTION OF THE PREFERRED EMBODIMENTS

An example with detailed description is given hereafter, but the realization of this invention is not limited to the example illustrated.

Figure 1:
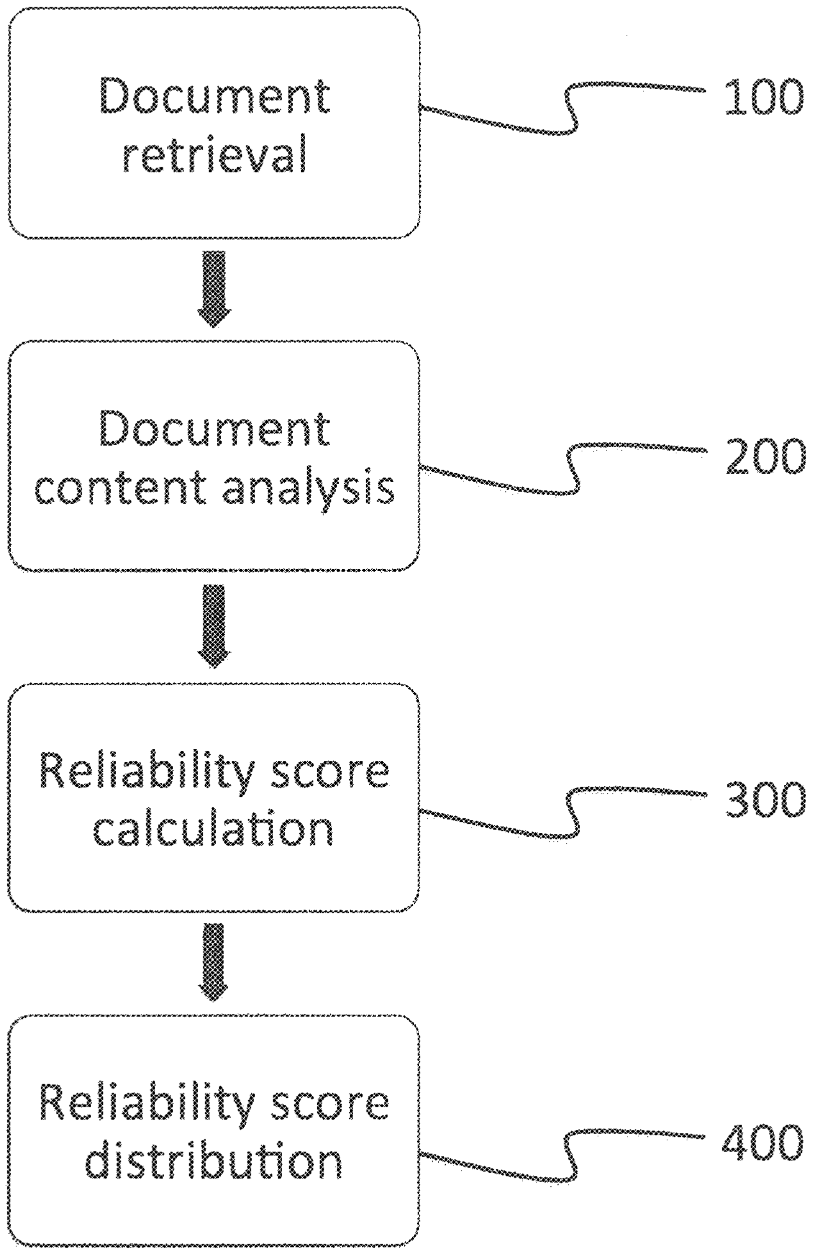
FIG. 1 is a flow chart that describes the general steps for scoring the reliability of online information.

FIG. 1 provides an overview of the general computer implemented process for creating and distributing a reliability score. At step 100, the document is retrieved by computer from a media (from a web site or collected via proprietary API for example). The document can be any multi-media information on the World Wide Web, e.g. a text, an image, an audio and/or a video registration. Then at step 200, this retrieved document is computer analyzed according to the type of document, e.g. text, audio, video, etc. Afterwards at step 300, a reliability score is calculated by a computer according to the analyzed result of the documents. In this step, a series of intrinsic criteria and extrinsic criteria stored in memory of the computer are applied successively to calculate the reliability score to qualify the information. Finally at step 400, this reliability score is electronically distributed to different customers.

Figure 2:
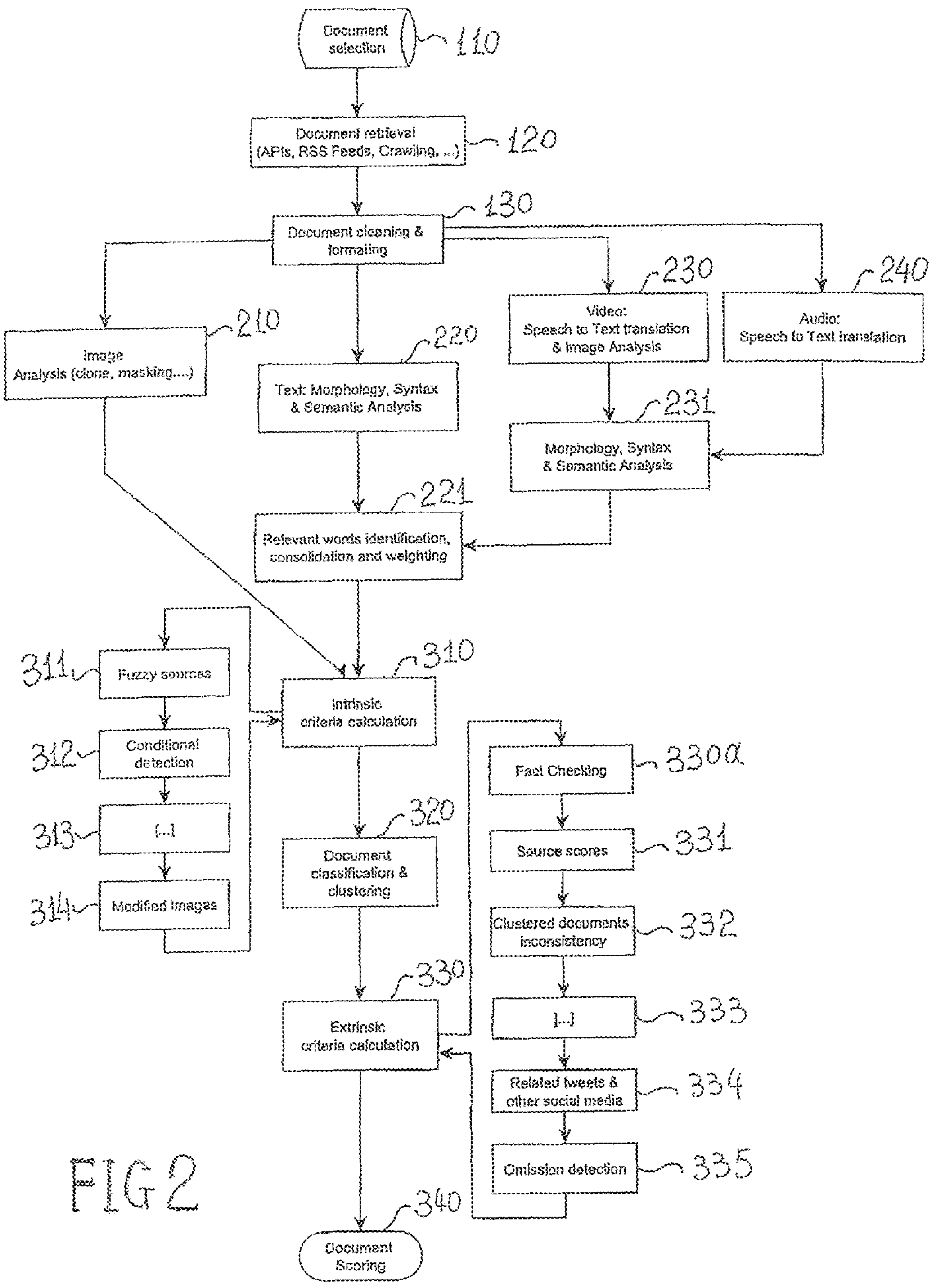
FIG. 2 is a flow chart that describes in details the various steps for creating, updating and distributing the reliability score.

FIG. 2 describes in more details this multimedia document scoring process. The steps 110, 120 and 130, each computer-implemented, constitute the computer-implemented step 100 in FIG. 1. According to the interest of customers, a document selection step 110 is performed. It can be all kinds of information, as for example a news article.

The step 120 shows the document retrieval, which is the process of automatic collection of information from the World Wide Web or other sources. This could be achieved by connecting to proprietary APIs, by using existing RSS news feeds or by crawling the World Wide Web.

A multimedia document (for example, a news article) can be updated by the source after the reliability analysis has been performed. As the pre-calculated scores are time-stamped, customers are notified that the multimedia document has been updated but the score has not yet been recalculated. The processing server is informed of this update in order to trigger a new cycle of multimedia document retrieval, analysis and reliability score calculation.

The step 130 illustrates the process of multimedia document cleaning, formatting and classifying according to its type (text, image, audio or video) before the next step of multimedia document analysis.

Figure 3:
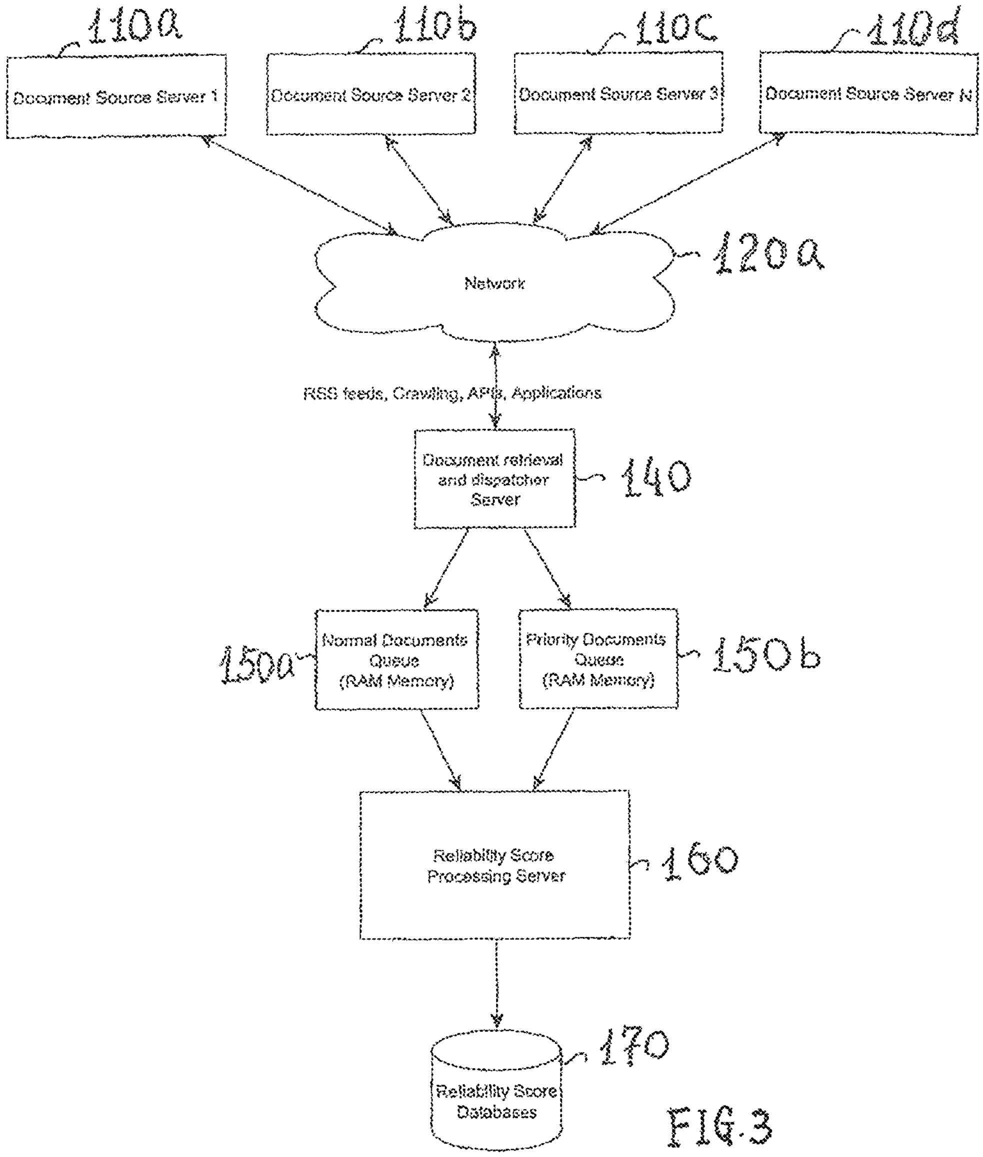
FIG. 3 is the diagram of the hardware for the implementation of the function for document retrieval.

FIG. 3 presents the diagram of the hardware for the implementation of the function for document retrieval. 110*a*, 110*b*, 110*c* and 110*d* represent different document source servers, e.g. the server of "Washington Post", the server of "Fox News". Different applications like RSS feeds, crawling, APIs collect the information from the servers via network as indicated by step 120*a*. The collected information goes through the multimedia document retrieval and dispatcher server as indicated by step 140 and is then classified either in the normal documents queue as shown in step 150*a* or in the priority documents queue as shown in step 150*b*. This information serves to calculate the reliability score in the processing server as indicated in step 160. Finally, this reliability score is saved in the databases as indicated in step 170. For additional discussion of exemplary computer-implemented hardware configurations see discussion with reference to FIG. 8, below.

The document retrieval process is configured according to the frequency and the number of times a source can be solicited. Information that has already been processed must be frequently updated, over an undefined period of time. For example, this multimedia document retrieval tool is adapted so as to collect breaking news emails in order to quickly retrieve urgent information from email alerts sent by newspapers. This will allow a quick response to frequent changes of that information. Documents collected via breaking news will be automatically dispatched into the priority queue displayed in FIG. 3. Information is then assigned a new pre-calculated reliability score with every update.

The computer-implemented step 200 of multimedia document content analysis contains steps 210, 220, 230 and 240, each being computer-implemented. This analysis is performed in different ways depending on the type of document. If the content is a text, then morphology, syntax and semantic analysis are performed as indicated in step 220. If the content is in the form of an image, the analysis is performed by clone, masking, etc. as indicated in step 210. For the audio documents, the content is transformed to text via speech-to-text technologies before applying the text analysis as indicated in step 240. For the video documents, the analysis is a combination of the image and audio analysis previously explained as indicated by steps 230 and 231.

Figure 4A:
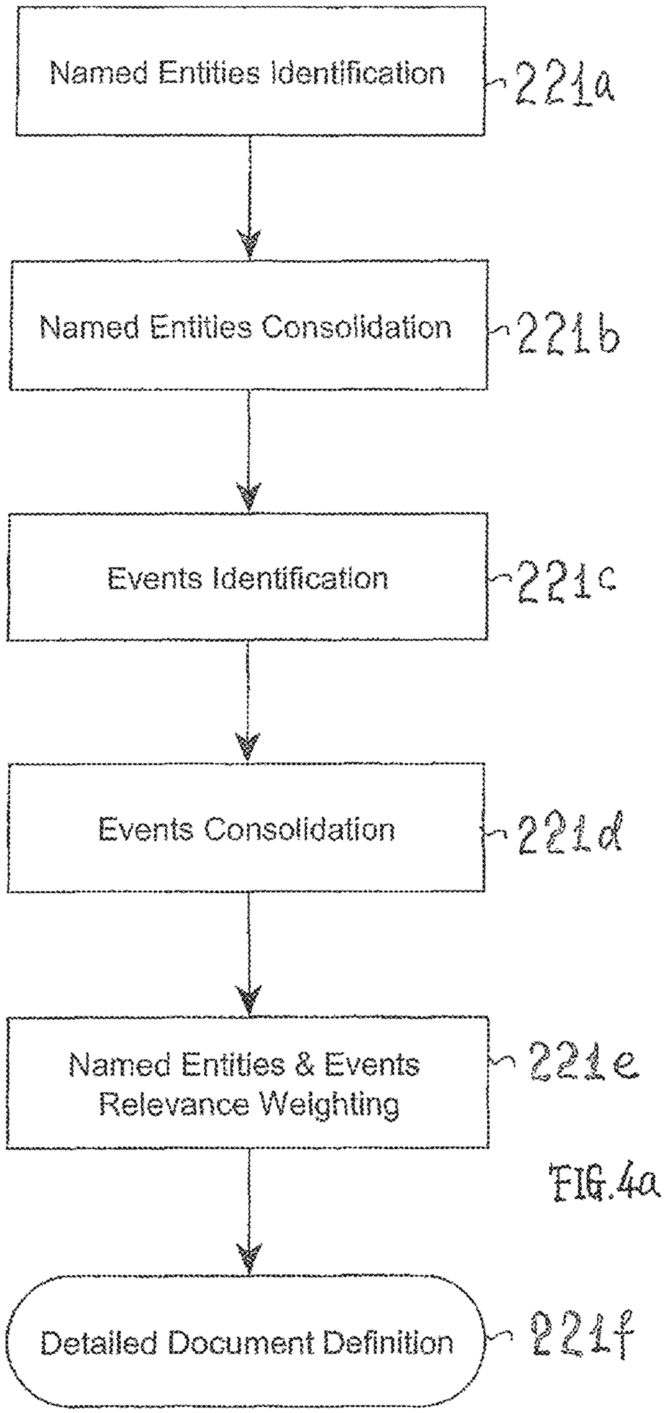
FIG. 4*a* is a flow chart that describes in details the identification, consolidation and weighting of relevant words.

Morphology and syntax analyses are used to determine the category each word belongs to: whether a verb, an adjective, a noun, a preposition, etc. To do this it is often necessary to disambiguate between several possibilities. For example, the word 'general' can be either a noun or an adjective and the context helps disambiguate between the two meanings. Let's say we have the following sentence: "Total number of shares amounts to 10M". "Total" is an ambiguous word that can be both the name of a company or an adjective to the word "number". Although, in the first case, the correct way of writing should be using the possessive (Total's) this is a common abuse of language that creates an ambiguity. The system will use the context to better understand the situation and choose the correct match: in this case, it will keep the longest word or set of words possible ("Total number" vs "Total"). During the relevant words identification and consolidation step 221 a named entity recognition is performed to locate and classify atomic elements in the text into predefined categories such as the names of persons, organizations, locations, expressions of times, quantities, monetary values, percentages, etc. as indicated in FIG. 4*a*.

Here, the text analysis is taken as an example. FIG. 4.*a* illustrates how to identify the weight of words found in the document which is to be scored. Steps 221*a*, 221*b*, 221*c* and 221*d* allow to select the most relevant named entities and events for a given news document. The selection method relies on the contrast between two types of textual units: on the one hand the named entities that denote referential entities that are well-identified in the specific document (e.g. Organization, Location, Person, Date, etc.) and on the other hand the terms that represent events that are linked to the previous referential entities.

Two levels of relevant named entities and events are extracted:

The first level relies on the relevant named entities and events that appear in the title and in the first paragraph of the document.

The second level relies on words co-occurring with the identified relevant named entities and events. The co-occurrence is the connection of two words together in the same sentence.

Different named entities and events have different relevance weightings according to their relevance with the content represented by step 221*e*. The weighting takes into account the number of occurrences in the text.

The more a word (or a synonym or an anaphora of it) appears in the text the more its weighting will be important. For documents comprised of a title and a header, weighting will be heavier for:

Words that are found in the title.

Words that are found in the header.

Words that are semantically close to the title (for example, the concept "prison" is close to "justice").

Documents may have several occurrences of the same event or may refer to completely different events concerning the same named entity and in order to extract the correct consolidated view of the document, several techniques are implemented. One is the unification of the same event's occurrences which concern the same named entities. In the following example "Acme Inc. plans to sell 1M shares. The share price will be $20," both sentences refer to the same named entity (the organization "Acme Inc.") and both events can thus be consolidated. In some other cases, a chronological order is detected to avoid consolidating different events that concern the same named entity. For example, in the following sentences "Acme Inc. plans to sell 1M shares.

Previously, the company planned to sell 2M shares", the system will extract two different events, both concerning the same named entity but with a different timeline (on the first event the company wanted to sell 2M shares and on the second event the company wants to sell 1M shares). This is possible by implementing a logic comparing verb tenses (past vs present, or past vs future, etc.) or by analyzing temporal adverbs (previously, originally, initially, etc.).

Finally, the step 221*f* shows a multimedia document's detailed definition based on the relevance weighting calculated in the step 221*e*.

Figure 4B:
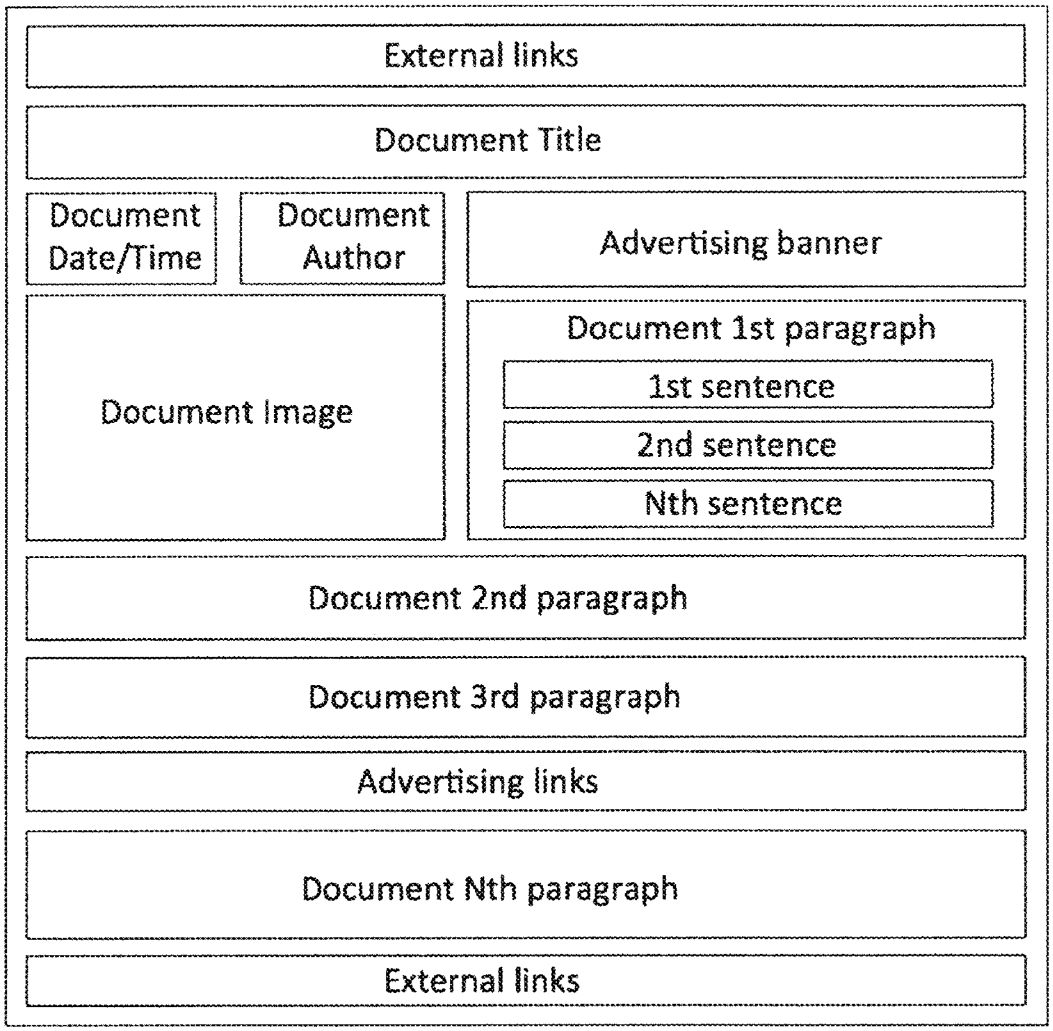
FIG. 4*b* is an example of document partitioning with an example the different parts of a typical news document on the World Wide Web.

FIG. 4*b* represents a typical online news article. Different parts of this article, which are represented in different colors, have different degrees of importance. For the document cleaning and formatting step 130, only the grey parts, e.g. title, date, author and text are used to calculate the reliability score of the document. To carry out the named entities and events relevance weighting step 221*e*, the words founded in the title and in the first paragraph are considered more important than those in other paragraphs.

In the reliability score calculation, step 300, the computer receives as input the original document and the metadata of the detailed document definition obtained in the process of FIG. 4*a*. It represents the calculation of the reliability score of a document by applying a first category of intrinsic criteria and a second category of extrinsic criteria. The intrinsic criteria are related to the document information itself: the content, the context in which the information is published, its date of publication/update, the use of conditional tense, lack of precision while providing the sources, etc. The extrinsic criteria include fact checking with a reference database, users-related criteria like the comments in related social networks, the crosschecking with other sources dealing with the same information so as to detect inconsistencies, omission, etc.

The step 310 for the intrinsic criteria computer calculation depends on the criteria linked to the document itself, like the use of the detection of the conditional tense use, inconsistencies between the title and the body of the text, spelling mistakes and so on, which are described by the steps 311-314.

The step 311 illustrates the detection of sources that are not properly identified by the author of the document. For example, usage of expressions such as " . . . according to numerous sources close to the situation . . . " " . . . according to unofficial sources . . . ", " . . . citing unnamed company sources . . . " or even "according to people briefed on the matter" means that the author is not transparent enough about the source of the information. Thus, when a document contains such expressions instead of clear and transparent sources' identification, the computer lowers its reliability score.

The step 312 illustrates the detection of the conditional tense, an intrinsic criterion related to the document itself. When an author is unsure of the reliability of a piece of information, he may use the conditional tense to protect himself. Once the morphological, syntactic and semantic analyses have been carried out, it is necessary to analyze the conjugation of the verbs linked to the most relevant words. Identifying the verb carrying the meaning is crucial. It is necessary to simultaneously look for textual clues in the document (such as "it seems that") bearing the same conditional function. If the verb tenses of the principal information are different in the title, header and text, but especially if the title is in the present or present perfect while the header and text are in the conditional, the document's reliability score will be lowered. Though titles may not contain a verb, some nouns can replace a verb. For example in the title "looting in Montpellier supermarket", the computer replaces the word "looting" with the expression "was looted". Similarly, a document with the title "Mr. X, possible candidate for town hall" where "possible" implies the information is in conditional tense.

The step 313 shows other criteria such as inconsistencies between the title and the content inside a text document.

If the document is not a text one, other criteria are carried out, such as the detection of digitally modified images as illustrated on step 314. When news article contain a photo it is necessary to check that it has not undergone substantial alterations such as cloning, masking, adding or deleting of fictional elements and so on. In the case of event-related news (for example, terrorist act, strike, accident) it is necessary to verify when the photo was taken by checking its metadata. The computer thus lowers the reliability score of the article if it was taken a long time before the events or comments on the photo. This may be relevant for example when photos are used to illustrate a strike.

Document thoroughness is another intrinsic criterion. A reliable document should contain the 5 "W" relating to its principal piece of information: Who, What, Where, When and Why about an event. If several "W" are missing, the document's reliability score will be lowered.

After the step 310, the multimedia document individual analysis is finished. The step 320 represents the multimedia document classification and clustering. A cluster contains all multimedia documents coming from one or several sources dealing with the same information. For example, two multimedia documents created by different sources and describing the arrest of the same person will be integrated in the same cluster.

The aim of this task is to identify multimedia documents dealing with the same topic in order to group them together. Various elements will be used to achieve this. It is crucial that, for example, a multimedia document announcing the launch of a new product by a company must not be associated with another multimedia document describing the acquisition of this company by another one. In order to identify the principal topic of a multimedia document, the detailed document definition described on FIG. 4*a* is needed. In some cases, for 2 documents to be grouped together they must have a close date of creation. For example, for some topics such as sports, a 12-hour window can be adopted while for other "long trend" topics the grouping windowing could reach several days.

There is no limit to the number of multimedia documents that can be associated in the same cluster. When the identification and consolidation of relevant named entities (persons, organizations, locations, products, etc.) and events of a multimedia document are finished, the computer system must classify them among the existing clusters:

If the multimedia document contains the same relevant named entities and events found in an existing cluster, it will be classified into that cluster. If there are inconsistencies between the new multimedia document and the already existing multimedia documents in the cluster, the processing of some extrinsic criteria will be triggered and thus the reliability score will be updated. If no inconsistencies are detected between the new multimedia document and the already existing multimedia documents in the cluster, the reliability score of the existing multimedia documents will not be affected.

If no existing cluster is identified as being relevant, the multimedia document will constitute a new cluster.

To avoid having isolated multimedia documents because they are being processed simultaneously and therefore cannot be associated in real time, a verification and consolidation process of existing clusters is necessary. A process of background consolidation of clusters (e.g. to find and unify multimedia documents that are isolated in different clusters but deal with the same topic) is triggered to improve the precision of results. When this process succeeds in unifying several clusters, some of the extrinsic criteria will be recalculated and thus the reliability score will also be updated.

Each cluster contains a representative multimedia document that defines most adequately the association. This avoids having to compare new entries with all the multimedia documents that are already present in a cluster. Of course when a cluster contains a single multimedia document, that multimedia document will be the representative. Multimedia documents using different languages are also clustered together. Inside a cluster, different sub-clusters can be created depending on their language, country of origin, sources and so on.

The steps mentioned above are presented in FIGS. 5*a* and 5*b* with flow charts for multimedia document classification process and clustering consolidation process respectively. The step 341 describes the end of document intrinsic analysis. Then the document intrinsic score, which is represented by the reliability score, is stored in the step 342. Subsequently, an assessment is done in step 343 to classify the document into the relevant cluster. When such a cluster already exists, the flow goes to "Yes", the new multimedia document is added to this cluster as indicated in step 344. If there is no relevant cluster, the flow goes to "No" and a new cluster is created as indicated in step 345.

After the step 344, the new added multimedia document is compared with the other multimedia documents already existing in the cluster. Extrinsic document criteria like omission and inconsistency are calculated as indicated by step 346. Finally, a decision is made in step 347: whether to change the reliability score of the existing cluster multimedia documents. If "Yes", the updated score is stored for all the multimedia documents in this cluster as indicated in step 248; if "No", only the score of the new multimedia document is saved as shown in step 349.

Figure 5B:
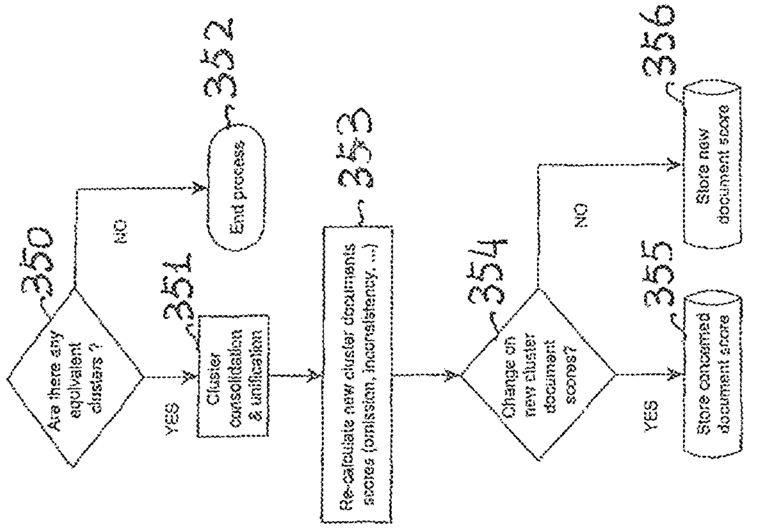
FIGS. 5*a* and 5*b* are flow charts that describe the document association using respectively technical classification and clustering.
Figure 5A:
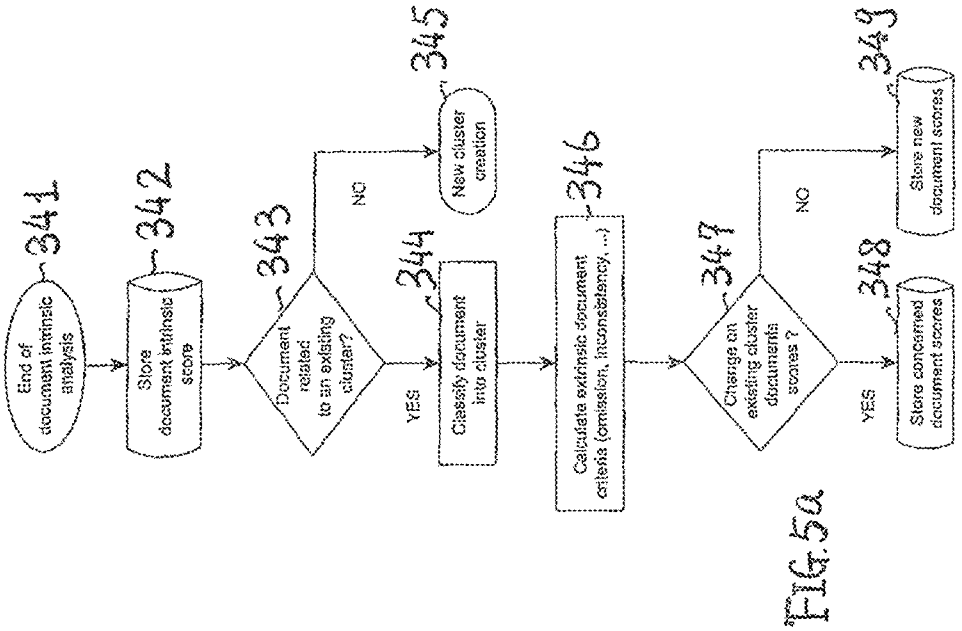

FIG. 5*b* represents an asynchronous cluster consolidation process to detect and merge the equivalent clusters. It starts with a comparison of step 350, if there are equivalent clusters with the answer "Yes", it goes to step 351 to perform cluster consolidation and unification. If "NO", it goes to step 352 to end the process.

After step 351, the reliability score of all the multimedia documents in the new unified cluster are re-calculated based on the inconsistencies between the documents. Finally, the decision to change the scores of new document clusters scores is done in step 354: if "Yes", the concerned multimedia document ratings are updated by storing the updated reliability score in step 355; if "No", only the score of the new multimedia document is stored in step 356.

For the steps 346 and 353 for the re-calculation of the reliability scores of the multimedia documents in a cluster, there are several possibilities such as the omission of some information, inconsistences, etc. The step 330 for the extrinsic criteria calculation depends on the criteria linked to other documents, like the reliability score of the sources where the news come from, the inconsistency relative to other documents in the same cluster, the comments on the other social media and network and so on, which are represented by the steps 330*a*-335.

The step 330*a* of fact-checking is an extrinsic criterion that can be calculated by the computer without document classification or clustering. All facts identified inside the document are verified with a knowledge database, e.g. created from corporate reporting, governmental figures, public medical resources, and Wikipedia's infoboxes amongst other Open Data sources. Here is a non-exhaustive list:

Geographical data: Town T belongs to this or that country, River R goes through this or that continent; there are Y inhabitants in this or that country and so on.

Dates: when a public figure was born, deadlines for tax payments, when a company was founded, beginning and end of a political phase, when a place/invention was discovered, when an album was released, when a product is supposed to be released, and so on.

Corporate figures: stock values, forecasts, deal value amounts, dividends distribution, product prices, etc.

Verification of administrative or legal procedures, required documents for a given transaction, etc.

Public figures: unemployment figures, taxes, national debt, etc.

Characters/directors in films, authors, musicians.

Drug contraindications, posology and interactions

People belonging to a political party, government, company, organization and so on.

Real estate price average of specific neighborhoods

If a multimedia document mentions a fact that contradicts the knowledge base considered as a reference, the computer lowers its reliability score.

As in the step 331 of source score, a source can be a publisher of a newspaper, but can also refer to a recognized author. In general, the score of a source will depend on the score obtained by the multimedia documents created by that source. For example, the score of a news website is constituted by the weighted-average of the newspaper's various sections, and the score of the sections is constituted by the weighted-average of the section's various multimedia documents over a period of time.

Each source has a reliability score that evolves according to the weighting of the rate obtained by its various multimedia documents. The documents that were right from the beginning are called visionary documents and are attributed a higher reliability score. The reliability score of sources and authors evolves in time and is not based solely on the values manually assigned to them during the launching period.

As represented in the step 332 regarding inconsistencies between multimedia documents, the aim of this criterion is to detect factual information that varies from one document to another. If an inconsistency is detected, a warning is triggered on the reliability score.

Different types of inconsistencies can be detected: the first one verifies the information's meaning in order to detect, for example, if the tone of one document is positive about an event when another is negative. The idea behind this criterion is to provide the customer with an overall picture of the opinions extracted from one or more documents about an event and its properties (that is to say its description). The following example illustrates the previous: during the acquisition of one company by another, public opinions can differ not only concerning the financial operation itself (is it positive for the city, for the country?, what is going to happen with the employees and the shareholders?) but also about, for example the location of the future headquarters (was there a hidden tax inversion strategy?). Another type of inconsistency concerns the facts relating to the words that have been identified in the text (non-exhaustive list):

Different figures and amounts (company forecasts, unemployment rate, product prices, and number of people on strike, etc.). The difference must be significant to be relevant.
Different currencies or exchange ratios.
Different locations.
Different names of people.
Different dates.
Different brand names, product specifications.
Different genders (male/female).

The application of this inconsistency criterion requires that at least 2 documents be associated in a same cluster.

The following is an example of inconsistency detection through the comparison of two different news articles. Let's say that in the first article we have the sentence "23 Egyptian policemen killed in Sinai Peninsula by suspected militants" and in the second article we have "Militants kill at least 24 police officers in Egypt". The tool associates together both articles as it understands that "Sinai Peninsula" is compatible with "Egypt" and it detects there is an inconsistency between the "23 Egyptian policemen" and the "at least 24 police officers" properties extracted from the two sentences.

There are many other criteria represented by step 333, one of them is rumor detection, which is another important criterion. Although rumors sometimes end up being true, the fact that it is a rumor necessarily raises doubts. The idea is not just to look for the word rumor/hoax/speculation in the text but to detect whether the principal piece of information is centered around a rumor, and whether the author is sure of its reliability or not. For example, the author may be using the conditional tense or uncertain expressions such as "While the facts are still unclear . . . ", " . . . details about the case remain sketchy . . . " or "Officials don't know at this point . . . ". Identifying the source of the information is key in this process. As an example, information that is only present in social networks and not in traditional news media has a greater probability of being a rumor. In addition, while checking the official sources such as press releases, the system verifies if the information is officially confirmed or denied by the concerned parts.

User-related criteria calculations are part of the extrinsic criteria. The idea behind these criteria is to detect the opinion of a community (social networks, a collection of people writing comments on websites, etc.) regarding the reliability of a multimedia document as represented by step 334.

Another example of extrinsic criteria is the omission detection as shown in step 335. When the omission of an important piece of information or fact in a multimedia document is detected, a warning is triggered on the reliability score. In order to detect such an omission, the following is performed: During the comparison of the current document with documents of the same cluster, facts that are present in several documents are considered as important. If one of these important facts is missing from the current document, the system detects the omission. The omission can be more or less weighted depending on the tonality (positive, negative, neutral) of the missing fact: if in a press release a company is hiding a negative fact about the past quarter's earnings, it will have a bigger impact on the reliability than if it is hiding a positive fact. If in addition any of the 5 "W" (Who, What, Where, When and Why) are missing, the multimedia document is not considered as thorough because there is a potential omission. Moreover, a fact or a quote without a source or with a source that is imprecise is also detected by the system. For example, in the sentence "The broker received the order to sell all the stocks", the subject "whom" is clearly missing and thus the information is incomplete.

In conclusion and returning to FIG. 2, step 340 represents the final multimedia document scoring, the process that takes into account and weights all the editorial criteria (both intrinsic and extrinsic) analyzed during the process.

For the sake of transparency, the score comprises a detailed explanation as well as the proof of the application of every reliability criterion to the customer. In this way, the reliability score of the multimedia document is completely understood and not considered as being provided by a "blackbox".

Thus, when the system detects a conflicting report with another multimedia document, it provides their URLs and pinpoints exactly where the conflicts have been found. To illustrate this proof facilitation, if in a news article about the IPO (Initial Public Offering) of a company there is an inconsistency with the price of the shares that are going to be sold when compared with the official Securities and Exchange Commission filing, the system will provide the customer with the URL to the filing itself.

Returning to FIG. 1, the step 400 illustrates the reliability score distribution. The main goal is to display a pre-calculated reliability score associated with a multimedia document. A tool to distribute and display the reliability score must retrieve this score and associated metadata from a distant database and display them on a device. This tool can be a web browser extension or any other multimedia application compatible with devices such as PC, mobile phone, tablet, TV, radio, etc. And these tools can also integrate the functions of update, retrieval and aggregation of multimedia documents.

Figure 7:
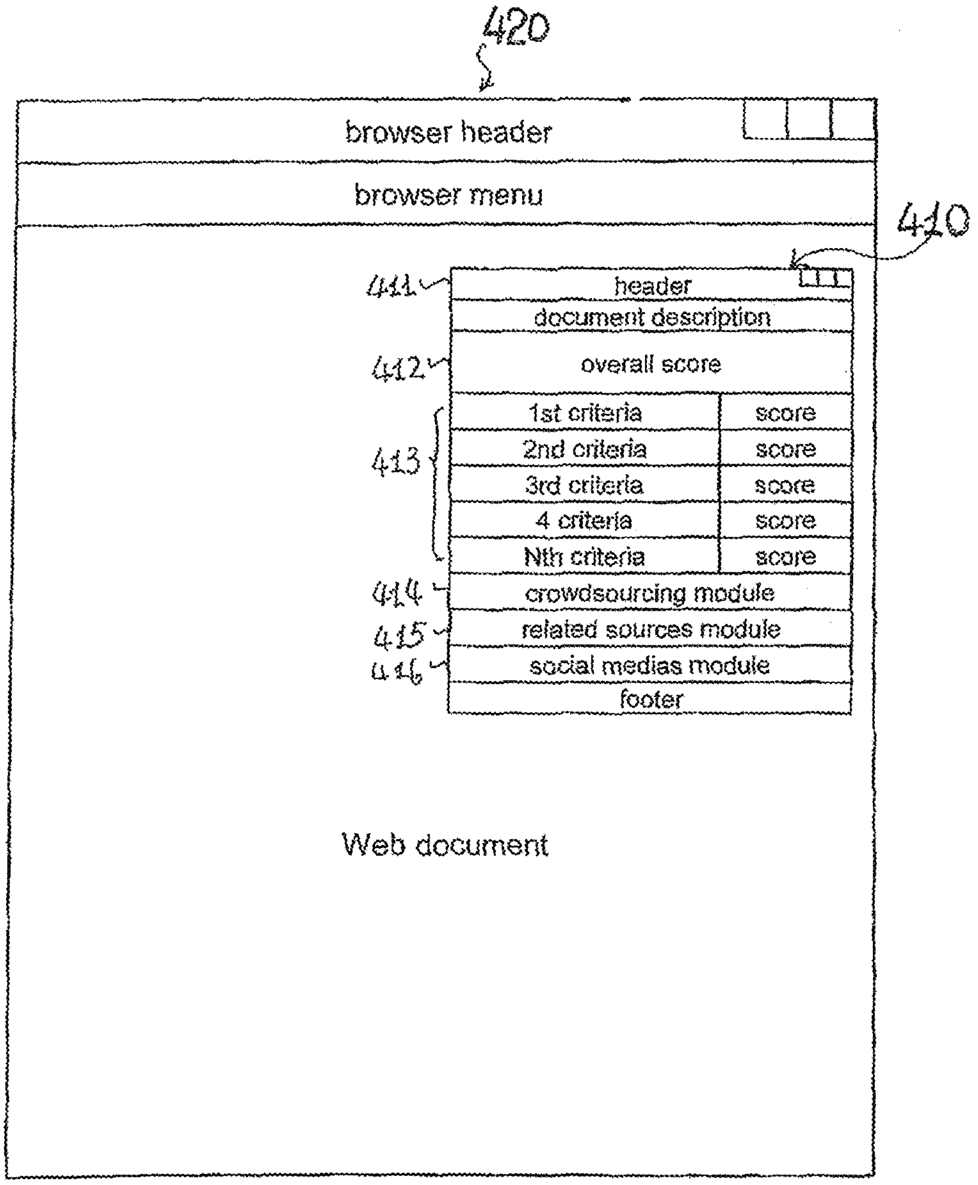
FIG. 7 illustrates a display of a reliability score to customers.

FIG. 7 illustrates an example of such a web browser extension or "add-on" 410 rating the content in a webpage 420. The content of the news is chosen arbitrarily as an example and has no importance for understanding this invention.

The add-on 410 is composed of several parts: the header 411, the overall reliability score 412 and the set of intrinsic and extrinsic criteria 413. Indicated as 415, the user is able to quickly give his opinion regarding the reliability of the document. Additionally, 416 indicates the related multimedia documents as well as related social network messages such as tweets.

Every time a customer browses a web page that contains a multimedia document with a pre-calculated score in the database, an icon is automatically positioned in the document to notify the customer that the precalculated score is available. When the customer clicks on this icon, a pop-up window appears and provides a first level of information on the reliability of the multimedia document. This score is always time-stamped. A "more information" link redirects the customer to a website where extra information, links to related documents and the community's comments are available.

Once the add-on is installed on the customer's browser, it is easily accessible thanks to an icon dynamically positioned in the multimedia document as well as a button in one of the browser's menu. When the precalculated score is not available for a multimedia document, customers can manually request its processing via the add-on. For example, if a customer seeking information about a given medication on Internet health forums wants to ensure the advice provided by forum contributors on this medication is safe, the system will automatically verify the reliability of the forum's posted content through cross-checking the information (posology, contraindications, interactions, etc.) with official health databases.

Every time a customer browses a web page, a request is made to the reliability score database to check whether the pre-calculated score is available or not. In order to avoid querying the database with multimedia documents that have with no interest to be analyzed (web mail pages, ecommerce websites, etc.), the add-on filters up-front the document sources having already been rated by the system using both a whitelist and a blacklist. In addition, customers can optionally configure the sources they want to be processed.

The reliability score is distributed to customers by a process of score distribution. The process of score distribution can be performed in different modes: in real time, periodically or randomly. Meanwhile, there are various tools to realize the process of the score distribution, like an interactive service, a mobile application or an alerting service, etc. The following paragraphs illustrate several possible combinations of score distribution modes with score distribution tools as example, but these examples do not have limitative effect, all the other combinations are possible.

The process of score distribution is in the form of an interactive service, such as a web interface to verify the reliability of any multimedia document provided by the customer. For example, a blogger may want to validate the reliability of a piece of content before publishing it to the Internet. To provide a more corporate example: if a company wants to verify whether a contract is in accordance with a specific statute before it signs it, the system will automatically identify the relevant sections of the contract and check its validity against the official statutory documents. The system will also verify whether the reference made to a given statute in a document is accurate and whether the content of the statute matches what is described in the document.

The process of score distribution is in the form of a mobile application, such as an interactive widget displaying the reliability scores of multimedia documents and sources to be included in websites. The display will consist of a listing of the different multimedia documents reliability scores offering the possibility to see progressions and regressions in the scores or rankings over time. The process of score distribution in the form of a daily, weekly or monthly newsletter showing the reliability scores and rankings of multimedia documents and sources according to the interests of the customer.

The process of real-time score distribution in the form of an alerting service informing of the reliability scores and rankings of multimedia documents and sources. The following description illustrates a financial alerting service: First, the customer provides a list of companies and/or industries he is interested in, for example "Microsoft" and "Information Technology". Additional steps of filtering by source, language or geography can be offered. Then, the service automatically identifies and collects the list of multimedia documents already analyzed and matching the customer's interests. And finally, the service delivers to the customer the list of multimedia documents and sources classified by topic and ordered by reliability score in the form of email, SMS or smartphone notifications. Such an alerting service can be delivered to the customer not only in real time mode but also in a periodic mode (daily, weekly, monthly, etc.) or even in a random mode (once a specific threshold is reached for example).

The process of score distribution in the form of a web interface coupled with an alerting service to verify the reliability of any multimedia document found in the Internet compared with one specific multimedia document provided by a customer. The following description illustrates an implementation of such a service: a verification tool for media reproduction of press releases. First, the customer provides via the web interface a press release document that is to be considered as reliable. Then, the tool analyzes this press release in order to extract the relevant named entities, events and event properties. Then, the service automatically searches and collects the list of multimedia documents that have communicated about that specific press release. And finally, the service delivers to the customer the list of multimedia documents and sources classified by topic and ordered by reliability score in the form of email, SMS or smartphone notifications. This delivery can be performed in real time or during a pre-defined lapse of time (next day, during the following week, etc.).

Figure 6:
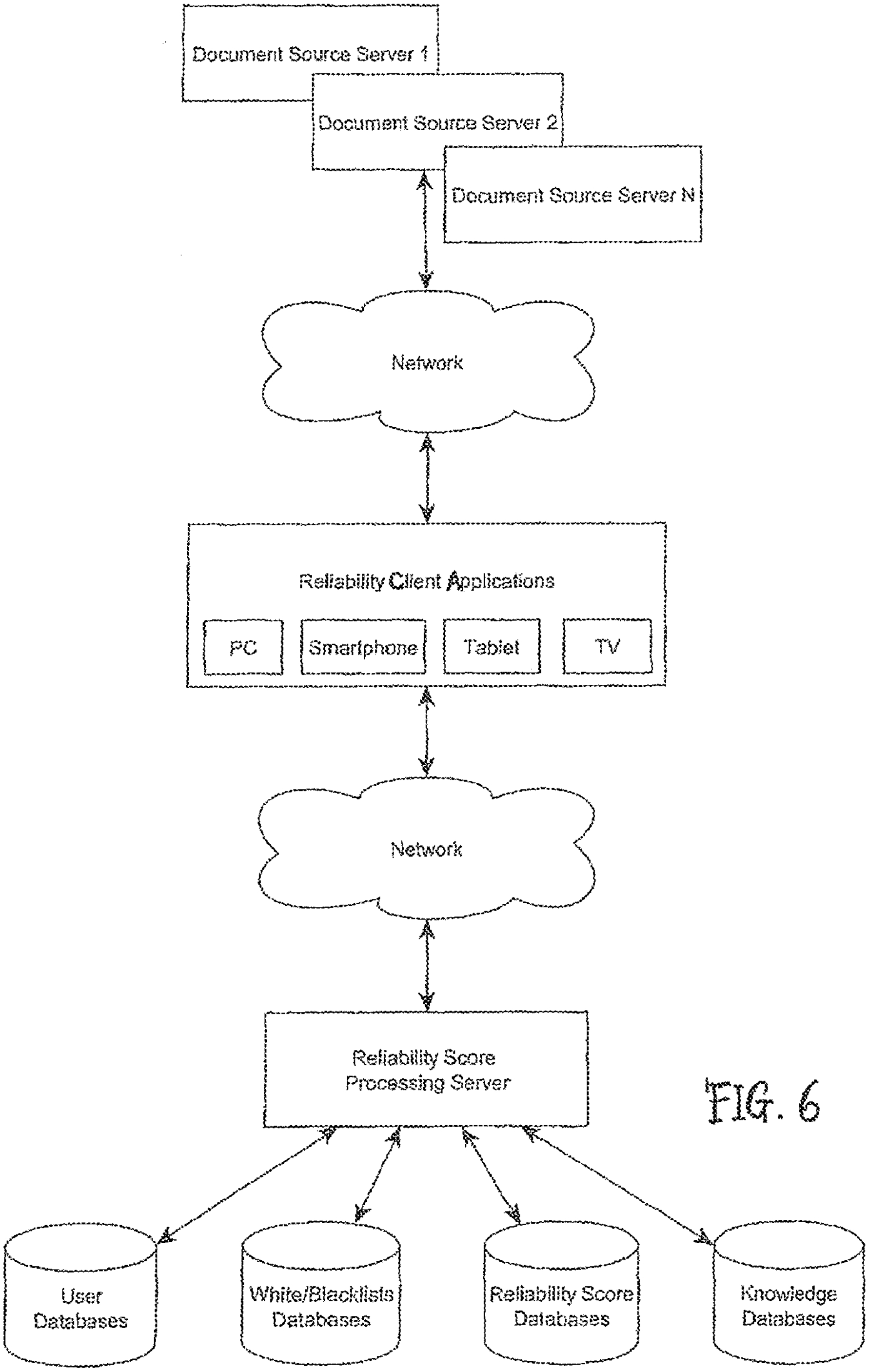
FIG. 6 is the diagram of the hardware for the distribution of the reliability score through different customers.

The diagram of the hardware for the distribution of the reliability score to different customers is represented in FIG. 6. In one hand, the documents are retrieved from document source server 1, 2 . . . . N; at other hand, the reliability scores are read from the processing server. At the different applications of customers, e.g. PC, Smartphone, Tablet, electronic glass or TV, the documents are displayed with the corresponding reliability scores. Additionally, the reliability score processing server contains sub-databases: user databases, white/blacklists databases, reliability score databases and knowledge databases.

The methods and apparatus or system to provide a customer with multimedia documents, tagged with a reliability score are computerimplemented, as discussed above. While a variety of different computer hardware (electronic circuit) embodiments are envisioned, FIG. 8 illustrates some of these.

Figure 8:
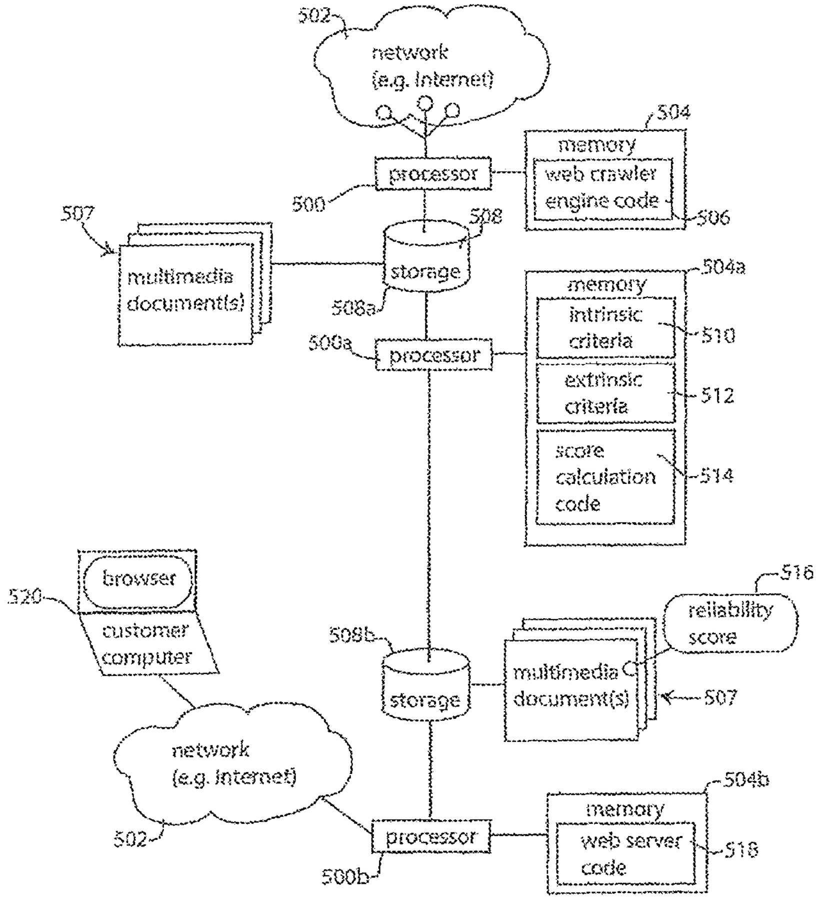
FIG. 8 illustrates an exemplary computer (electronic circuit) hardware diagram.

As shown in FIG. 8, the processor 500 of a multimedia document retrieval computer or server is coupled to communicate with a network, such as the Internet 502. Attached to processor 500 is a memory circuit (e.g., RAM memory) in which has been stored web crawler engine code 506. Such code may be written in a variety of different computer languages, such as Python, C++, Java, and the like. Alternatively a publicly available web crawler system such as PolyBot, UbiCrawler, C-proc, Dominos, or the like may be used.

Processor 500 is thus programmed to crawl the network (Internet 502) to retrieve multimedia documents 507, which processor 500 stores in a storage device 508 attached. Storage device 508 may be configured as a database as discussed above.

Once a relevant corpus of multimedia documents 507 has been analyzed, each multimedia document is scored as discussed above. To perform such scoring, a processor 500*a* (which could be the same physical processor as processor 500, or a different processor) executes score calculation code 514 stored in the memory 504*a* attached to processor 500*a*. If processor 500*a* and processor 500 are the same device, memory 504*a* may be an allocated portion of memory 504.

The processor 500*a*, is configured to access the database of multimedia documents 507. Thus processor 500*e* may either access the same storage device 508 as attached to processor 500, or it may have its own attached storage device 508*a*. In FIG. 8, one graphical representation has been provided in association with both reference numerals 508 and 508*a* to illustrate that the storage device functionality may be the implemented using same physical device or implemented as separate physical devices.

In executing the score calculation code, based on the score calculation discussion above, the processor 500*e* uses intrinsic criteria and extrinsic criteria. These criteria are both stored in memory 504*a*, as at 510 and 512, respectively. As each multimedia document is scored, its calculated reliability score 516 is associated with that multimedia document and stored as part of the database record for that document within a storage device 508*b*. Similar to the explanation above, if desired, the functionality of storage device 508*b* can be implemented using the same physical storage device as connected to processor 500*a* (and/or processor 500).

With the corpus of multimedia documents 507 now each having an associated reliability score 516, they are ready to be accessed by a user or customer. This may be done by providing access via a web server. To implement this, processor 500*b* is coupled to the network (e.g. Internet 502). Processor 506*b* may be physically separate from processors 500*a* and 500, or it may be the same physical device as processors 500 and/or 500*a*. Attached to processor 500*b* is memory 504*b* in which an executable web server code is stored. A suitable web server code may be implemented using publicly available Apache HTTP web server code, for example.

Processor 500*b* is attached to storage device 508*b*, which may be the same physical storage device as devices 508*a* and/or 508, or which may be a separate device, storing a copy of the data transferred from device 508*a*. The user or customer accesses the web site established on the network by processor 500*b* and through this connection the user or customer enters his or her requests for data, specifying any special criteria as discussed above. The processor 500*b* delivers selected multimedia content from the corpus of multimedia documents 507 that meet the user or customer's requirements, as more fully explained above. If desired the executable instructions for some or all of the functions described above (e.g., the executable code stored at 506, 514 and 518), as well as the data structures and schema of the database configured within storage device(s) 508, 508*a*, 508*b* and as well as the data structure definitions in which the intrinsic criteria 510 and extrinsic criteria 512 are stored may be stored in non-transitory computer readable media.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method programmed in a non-transitory memory of a device, the method comprising:
- browsing source information to obtain multimedia information;
- clustering a plurality of related multimedia information in a cluster;
- calculating a reliability score for the multimedia information including performing video analysis including:
  - audio analysis; and
  - image analysis by:
    - determining if masking of elements has occurred in the multimedia information including comparing the plurality of related multimedia information in the cluster, and
    - analyzing metadata of the multimedia information.

2. The method of claim 1 further comprising updating the reliability score by applying extrinsic criteria including user comments from one or more social networks.

3. The method of claim 1 further comprising computing a global reliability score of a source of the multimedia information based on the reliability score of the multimedia information.

4. The method of claim 1 further comprising filtering the multimedia information in order to block displaying of the multimedia information with the reliability score below a threshold.

5. The method of claim 1 further comprising providing additional content when the reliability score of the multimedia information is below a threshold.

6. The method of claim 1 wherein image analysis includes photo dating.

7. The method of claim 1 further comprising notifying a user if the multimedia information has been modified.

8. The method of claim 1 wherein the multimedia information comprises breaking news.

9. The method of claim 1 further comprising comparing the multimedia information with older multimedia information to determine differences between the multimedia information and the older multimedia information.

10. The method of claim 1 further comprising comparing the multimedia information with an older version of the multimedia information to determine differences between the multimedia information and the older version of the multimedia information.

11. The method of claim 1 wherein performing image analysis includes detecting an omission to determine if an element has been omitted from an image.

12. The method of claim 1 wherein image analysis includes photo dating.

13. The method of claim 1 further comprising providing additional content based on the reliability score of the multimedia information.

14. The method of claim 13 wherein providing additional content includes a warning label.

15. The method of claim 1 wherein image analysis includes comparing the multimedia information against source multimedia information with pre-calculated reliability scores.

16. The method of claim 15 wherein the source multimedia information is cross-checked among different sources.

17. The method of claim 15 wherein the pre-calculated reliability scores are calculated when a threshold of interest in a topic is reached based on a number of requests for the topic and a measure of engagements.

18. The method of claim 15 further comprising filtering the source multimedia information according to a white list to exclude checking of an existing reliability score for multimedia documents coming from sources not in the white list.

19. The method of claim 15 further comprising filtering the source multimedia information according to a black list to exclude checking of an existing reliability score for multimedia documents coming from sources in the black list.

20. The method of claim 15 wherein a pre-calculated reliability score of a source multimedia information is decreased when a date within metadata of the source multimedia information pre-dates an event.

* * * * *